C. Robinson,
Miter Box.

No. 82,351.    Patented Sep. 22, 1868.

Witnesses
A. Haynard
Jas Norquet

Inventor
Clark Robinson
By his attorney
G. L. Chapin

UNITED STATES PATENT OFFICE.

CLARK ROBINSON, OF FOX LAKE, WISCONSIN.

Letters Patent No. 82,351, dated September 22, 1868.

IMPROVEMENT IN MITRE-BOXES.

*The Schedule referred to in these Letters Patent and making part of the same.*

TO ALL WHOM IT MAY CONCERN:

Be it known that I, CLARK ROBINSON, of Fox Lake, in the county of Dodge, and in the State of Wisconsin, have invented a new and useful Improvement in Mitre-Boxes; and I do hereby declare that the following is a full and exact description thereof, reference being had to the accompanying drawings, and to the letters of reference marked thereon, making a part of this specification, in which—

Figure 1:
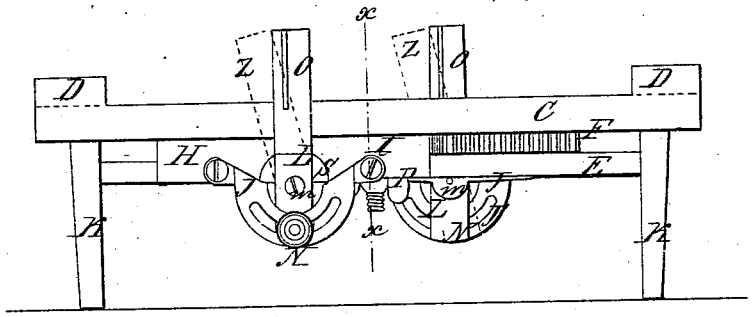

Figure 1 is a longitudinal elevation of my invention.

Figure 2:
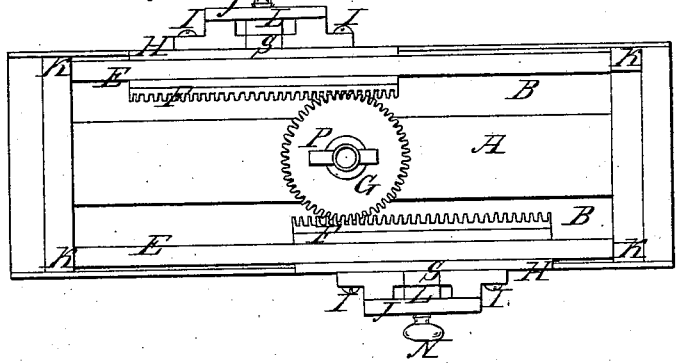

Figure 2, a bottom view of the same.

Figure 3:
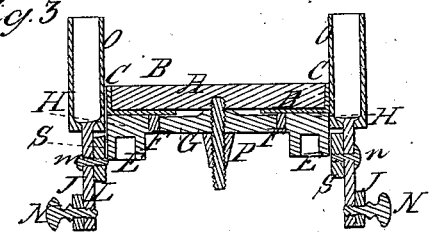

Figure 3 is a transverse section of the box, taken through the line $x\ x$, fig. 1, with both of the guides for the saw set opposite each other.

This invention relates to an improvement in that class of mitre-boxes which are adjustable, and can be set to cut joints having different angles; and its nature, in part, consists in a novel arrangement of angular plates, which are attached to the bottom of the box, and used as bearings for the guides which support the standard-frames, and also to hold the moulding to be cut properly on said bottom; and, in combination with these, a pinion and racks at the under side of the box, by means of which the guides are made to move on tracks, and carry the standard-frames with them to such points, relative to said bottom, as will give the required angle which the moulding is to have when cut by the saw.

In order to give a clear understanding of my invention, I have marked corresponding parts with similar letters, and will now give a detailed description.

A represents a substantial wooden bottom, which is made such a length and width as will be convenient to support the moulding to be cut, and it has attached to its edges and bottom, plates B C D, which are made of thin straps of metal, bent at right angles, as shown at fig. 3, for the purpose of keeping the bottom straight, and providing bearings for the upper sides of the guides H H, which are held in position to have a reciprocating motion between said plates and the bars E E; and also for the purpose of holding the moulding to be cut parallel with the sides of the box, the parts D D of the plates projecting above the bottom, A, for this purpose, as seen at fig. 1.

The bars E E are made of metal, and rigidly attached to the legs $k\ k$ of the box, and they are fitted to fill grooves made in the under sides of the guides H H, to which the standard-frames J J are fastened at I I, by screws. These frames have central lugs S S, to which the saw-standards L O are pivoted at $m\ m$, and outside of these lugs, and in the frames J J, are made slots J' J', through which thumb-screws N N are put, for holding said standards in position when they have been set the required angle for cutting a mitre.

The insides of the guides H H have made on them racks F F, which mesh in a pinion, G, pivoted to the under side of the bottom, A, and they cause it to turn on the pivot when they are moved to or from each other, which arrangement causes the guides to move equal distances, and carry the frames J J and standards L O with them. The use of the racks and pinions, however, together with the set-screw P for holding the pinion in position, I do not consider new, but use the device in order to provide a complete working box.

Those parts of the standards shown at O O, figs. 1 and 3, have sockets made in them to receive the ordinary wooden guides in which the saw is put, when in operation, and they are attached to the parts L L by means of swivel-joints, so as to turn in any direction required.

*Operation.*

The guides H H can be moved to or from the centre of the box, and bring the standards L O into a position to cut any angle from forty-five degrees to ninety, and, if a mitre and bevel are to be cut at the same time, the standards L O can be inclined, as shown by the dotted lines $z\ z$, fig. 1, taking the precaution to turn the thumb-screws N P tightly, when said standards L O have the desired position.

Having thus described my invention, what I claim, and desire to secure by Letters Patent of the United States, is—

The plates B C D, in combination with the frames J J, guides H H, having racks F F, standards L O, and pinion G, the whole being constructed and arranged substantially as and for the purpose herein specified.

CLARK ROBINSON.

Witnesses:
G. L. CHAPIN,
A. HAYWARD.